Patented Sept. 13, 1938

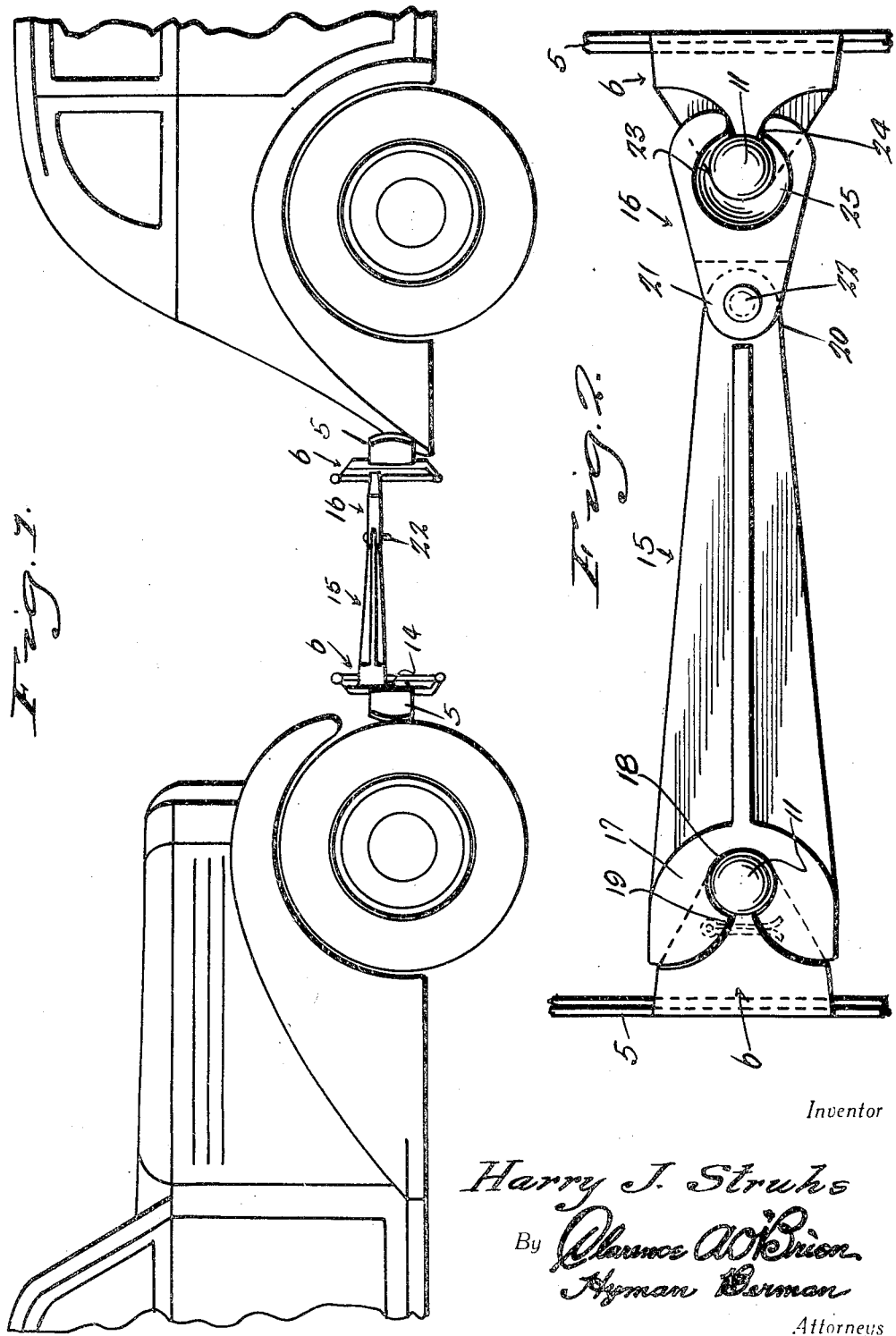

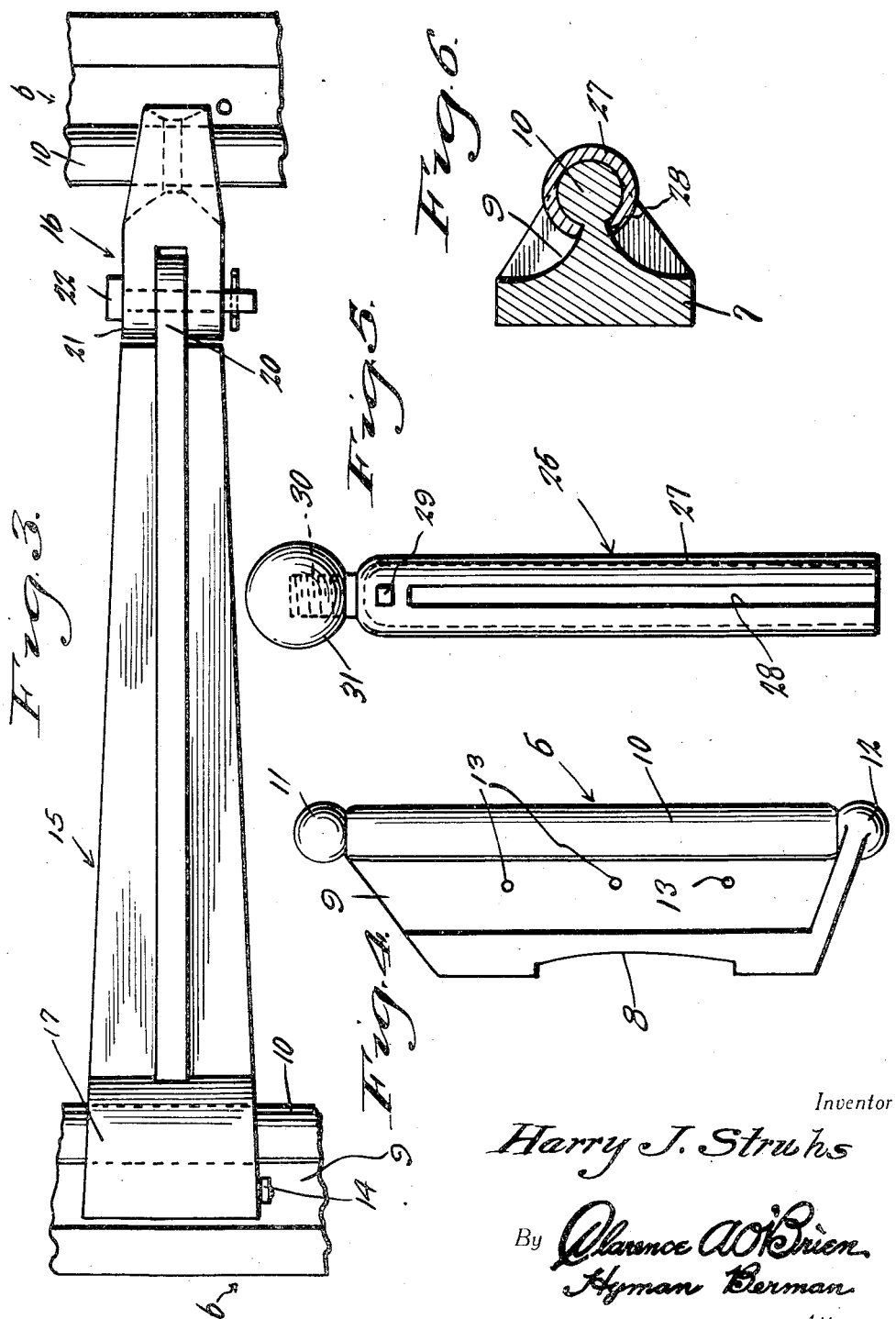

2,130,108

UNITED STATES PATENT OFFICE 2,130,108

COMBINATION BUMPER GUARD AND DRAFT CONNECTION

Harry J. Struhs, East Chicago, Ind.

Application July 30, 1937, Serial No. 156,595

7 Claims. (Cl. 280—33.14)

This invention has as its objects the provision of a member which will serve the two-fold purpose of a bumper guard and a draft connection.

In accordance with the present invention there is provided for mounting on the front and rear bumpers of an automobile members which will serve as bumper guards and which are also provided as to accommodate a draft pole for towing purposes or for hitching a trailer to an automobile.

The invention together with its objects and advantages will be best understood from a study of the following description taken in connection with the accompanying drawings wherein:

Figure 1 is an elevational view illustrating the application of the invention for towing purposes.

Figure 2 is a top plan view of the parts assembled for towing purposes.

Figure 3 is a side elevational view of the assembly shown in Figure 2.

Figure 4 is a side elevational view of a combination bumper guard and draft connection.

Figure 5 is an elevational view of an auxiliary member for use in conjunction with the bumper guard to provide a trailer hitch, and Figure 6 is a transverse sectional view showing the auxiliary member associated with the bumper guard.

In accordance with the present invention there is provided for each bumper 5 of an automobile, that is to say for the front and rear bumpers of the automobile, guard members 6. Each of the guard members 6 is in the form of an elongated bar 7 of metal or other suitable material having in one face thereof a notch 8 to accommodate the bumper 5, bar 7 being bolted or otherwise secured to the bumper.

Bar 7 is formed to present a rib 9 provided with a rounded vertical bead 10 having substantially spherical end formations 11 and 12. The rib 9 is formed with a vertical series of through openings 13 and a cotter pin or the like 14 is provided to engage a selected opening 13 and for a purpose hereinafter made manifest.

Further the invention comprehends the provision of a draft bar which consists of an elongated section 15 and a relatively short complemental section 16.

The section 15 is longitudinally tapered and of substantially cruciform shape in cross section. At one end the draft bar section 15 is provided with an integral head 17 having therein an opening 18 to accommodate the bead 10 and a slot 19 to accommodate the rib 9 as clearly shown in Figure 2. At its smaller end the section 15 is provided with a forwardly extending apertured lug 20.

The draft bar section 16 is also tapered and at its smaller end is bifurcated to provide a pair of co-extensive apertured ears 21 that accommodate the lug or ear 20 of the draw bar section 15, whereby through the medium of a pivot pin 22 sections 15 and 16 are pivotally connected together.

The draft bar section 16 at its largest end is provided with an opening or aperture 23 to accommodate the bead 10 of, as shown for example in Figure 1, the combination bumper guard 6 mounted on the rear fender of the draft vehicle. In this connection it will also be noted that the draft bar section 16 is provided with a slot 24 to accommodate the rib 9 of the aforementioned combination bumper guard and hitch connection. Also at the top and bottom thereof the draw bar section 16 is dished out as at 25 so that as between the draw bar section 16 and the member 6 to which it is coupled there will be but a minimum contact of metal against metal.

Referring to Figure 1 it will be seen that when it is desired to tow an automobile wherein both the draft and the trailing vehicles are equipped with combined bumper guards and draft connections 6, the head end 17 of draw bar section 15 is engaged with the bumper guard and draft connection 6 on the front bumper of the trailing vehicle and the head end of the draw bar section 16 is connected with the combined bumper guard and draft connection on the rear bumper of the draft vehicle.

To hold the draft bar at the desired elevation the cotter pin 14 is passed through a selected opening 13 in the bumper guard 6 of the towed or trailing vehicle and the head 17 of the draw bar section 15 will rest on the cotter pin 14 as shown in Figure 3.

When it is desired to couple the socket-equipped end of the draft tongue of a trailer to the bumper guard 6 mounted on the rear fender of the draft vehicle an auxiliary member, such as shown in Figure 5 and indicated by the reference numeral 26, is resorted to.

The member 26 which may be referred to as a trailer hitch connection, is in the form of a tubular sleeve 27 adapted to be sleeved onto the bead 10 of the member 6, the member 27 being provided with an elongated slot 28 to accommodate the rib 9 of the member 6. Also at the upper end thereof the sleeve or tubular member 27 is internally provided to accommodate the ball head 11 at the upper end of the bead 10, and is also equipped with a set screw 29 adapted to bind against the ball 11 to secure the member 27 positively engaged with the bead 10.

Also at the upper end thereof the member 27 is provided with a threaded pin 30 onto which screws a ball 31 adapted to fit in the usual socket provided on the free end of the draft tongue of a trailer whereby said tongue may be coupled to the draft vehicle in a quick positive manner.

It will thus be seen that in accordance with the present invention the member 6 will serve not merely as a bumper guard but also as a means accommodating either a draw bar whereby one vehicle may be towed behind the other, or with the member 26 associated with the member 6 as a means for suitably hitching a trailer to the automobile.

Having thus described the invention what is claimed as new is:

1. A combination bumper guard and hitch connection comprising an elongated plate adapted to be secured intermediate its ends to a bumper rod to be disposed perpendicularly on said rod, said plate being provided with a forwardly projecting longitudinal rib having at its free vertical edge a bead, in combination with a draw bar having a head provided with an opening to receive said bead and a slot at one side of the opening to accommodate said rib.

2. In a device of the character described, a combination bumper guard and hitch connection comprising an elongated plate adapted to be secured intermediate its ends perpendicularly to a bumper rod, said plate having a rib projecting from one face thereof, said rib having a vertical edge provided with a bead, a tubular member adapted to be sleeved onto said bead and provided with a longitudinal slot to accommodate said rib, said tubular member being also provided at the upper end thereof with a ball to accommodate the socket on one end of a trailer hitch.

3. In a device of the character described, the combination with a draft vehicle and a trailing vehicle of combination bumper guard and hitch connections mounted perpendicularly on the bumpers of said vehicles, each of said combination bumper guard and hitch connections including a plate provided for attachment to a bumper bar and having an integral rib having a free edge equipped with a bead, and a draft bar comprising a pair of pivotally connected sections, each of said sections having a free end provided with a head apertured and slotted to engage a combination bumper guard and hitch connection with the bead of said combination member engaging in the aperture of the head and the rib of said combination member being accommodated by the slot in said head.

4. In a device of the character described, the combination with a draft vehicle and a trailing vehicle of combination bumper guard and hitch connections mounted perpendicularly on the bumpers of said vehicles, each of said combination bumper guard and hitch connections including a plate provided for attachment to a bumper bar and having an integral rib having a free edge equipped with a bead, and a draft bar comprising a pair of pivotally connected sections, each of said sections having a free end provided with a head apertured and slotted to engage a combination bumper guard and hitch connection with the bead of said combination member engaging in the aperture of the head and the rib of said combination member being accommodated by the slot in said head, and the rib of each of said combination members being provided with a vertical series of spaced openings, and a pin adapted to be passed through a selected opening to support the head of the associated draft bar section whereby to support the draft bar at the desired elevation relative to the ground.

5. A combined bumper guard and hitch, comprising an elongated plate adapted to be secured intermediate its ends to a bumper bar to extend perpendicularly relative thereto, said plate being provided on one side thereof with an integral longitudinally extending rib provided at the free longitudinal edge thereof with a bead extending for substantially the full length of the rib and a draft member having a vertically extending part provided with a vertically arranged opening therein and a slot extending from the opening through an end of the member, said opening receiving the bead with the rib extending through the slot.

6. As a new article of manufacture, a combination bumper guard and hitch connecting element, comprising an elongated plate adapted to be secured intermediate its ends to a bumper bar to extend perpendicularly relative thereto, said plate being provided on one side thereof with an integral longitudinally extending rib provided at the free longitudinal edge thereof with a bead extending for substantially the full length of the rib, a ball coupling element, and means carried by the ball and engageable with the rib and bead on said plate for detachably securing said ball coupling element thereto.

7. A draw bar device for a vehicle comprising a vertically arranged member adapted to be connected to a part of a vehicle and said member having a substantially wedge-shaped part at its free edge which is vertically arranged and a vertically extending bead connected with the small and outer edge of the wedge-shaped part and a draw member having a vertically extending opening therein for receiving the bead and said member having a slot therein extending outwardly from the opening with the side walls of the slot being substantially divergent to receive the wedge-shaped part.

HARRY J. STRUHS.